US012696109B2

(12) United States Patent
Shao et al.

(10) Patent No.: US 12,696,109 B2
(45) Date of Patent: Jul. 28, 2026

(54) METHOD FOR DETECTING AN ARTIFICIAL INTELLIGENCE PREDICTION BEAM, NODE, AND STORAGE MEDIUM

(71) Applicant: ZTE CORPORATION, Shenzhen (CN)

(72) Inventors: Shijia Shao, Shenzhen (CN); Bo Gao, Shenzhen (CN); Shujuan Zhang, Shenzhen (CN); Ke Yao, Shenzhen (CN); Zhaohua Lu, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 278 days.

(21) Appl. No.: 18/570,433

(22) PCT Filed: Nov. 11, 2022

(86) PCT No.: PCT/CN2022/131382
§ 371 (c)(1),
(2) Date: Dec. 14, 2023

(87) PCT Pub. No.: WO2023/083303
PCT Pub. Date: May 19, 2023

(65) Prior Publication Data
US 2024/0284200 A1      Aug. 22, 2024

(30) Foreign Application Priority Data
Nov. 12, 2021    (CN) .......................... 202111342522.6

(51) Int. Cl.
H04W 24/02        (2009.01)
H04W 16/28        (2009.01)
(Continued)

(52) U.S. Cl.
CPC ........... *H04W 24/02* (2013.01); *H04W 16/28* (2013.01); *H04W 24/10* (2013.01); *H04W 80/02* (2013.01)

(58) Field of Classification Search
CPC ...... H04W 24/10; H04W 24/02; H04W 16/28
(Continued)

(56) References Cited

U.S. PATENT DOCUMENTS 11,139,881 B2 *  10/2021  Harada ................. H04B 7/0617
11,653,406 B2 *   5/2023  Zhang ................... H04W 24/08
                                                          370/216
(Continued)

FOREIGN PATENT DOCUMENTS

CN          112335281  A      2/2021
WO      WO2020214168  A1     10/2020

OTHER PUBLICATIONS

International Search Report in Application No. PCT/CN2022/131382, dated Feb. 8, 2023, 4 pages, including translation.
(Continued)

*Primary Examiner* — Peter G Solinsky
(74) *Attorney, Agent, or Firm* — Mogan, Lewis & Bockius LLP

(57) ABSTRACT

Provided are a method for detecting an artificial intelligence (AI) prediction beam, a node, and a storage medium. The method includes the following: A first communication node receives beam detection configuration information sent by a second communication node, the first communication node performs AI prediction beam quality detection according to the beam detection configuration information to obtain a beam quality value, and the first communication node re-determines a target beam in a case where the first communication node determines that the beam quality value does not meet a beam quality requirement.

20 Claims, 6 Drawing Sheets

A first communication node receives beam detection configuration information sent by a second communication node —S101

The first communication node performs AI prediction beam quality detection according to the beam detection configuration information to obtain a beam quality value —S102

The first communication node re-determines a target beam in a case where the first communication node determines that the beam quality value does not meet a beam quality requirement —S103

(51) Int. Cl.
   *H04W 24/10* (2009.01)
   *H04W 80/02* (2009.01)
(58) Field of Classification Search
   USPC ........................................................ 370/329
   See application file for complete search history.

(56) References Cited

U.S. PATENT DOCUMENTS

| | | | |
|---|---|---|---|
| 12,250,051 B2 * | 3/2025 | Xu ....................... | H04B 7/0695 |
| 2018/0182683 A1 | 6/2018 | Val et al. | |
| 2019/0182683 A1 | 6/2019 | Khirallah et al. | |
| 2020/0366340 A1 | 11/2020 | Zhang et al. | |
| 2021/0058132 A1 * | 2/2021 | Xu ....................... | H04W 88/08 |
| 2021/0336683 A1 * | 10/2021 | Pezeshki ............ | H04B 7/06952 |
| 2022/0190883 A1 * | 6/2022 | Kaya ................... | H04B 7/06952 |
| 2022/0217556 A1 * | 7/2022 | Rydén ................... | H04W 24/08 |
| 2023/0091383 A1 * | 3/2023 | Agarwal .............. | H04W 36/26 |
| | | | 455/436 |

OTHER PUBLICATIONS

Extended European Search Report in Application No. 22892096.3, dated Nov. 5, 2025, 12 pages.

* cited by examiner

METHOD FOR DETECTING AN ARTIFICIAL INTELLIGENCE PREDICTION BEAM, NODE, AND STORAGE MEDIUM

CROSS REFERENCE TO RELATED APPLICATIONS

This is a National Stage Application, filed under 35 U.S.C. 371, of International Patent Application No. PCT/CN2022/131382, filed on Nov. 11, 2022, which claims priority to Chinese Patent Application No. 202111342522.6, filed with the China National Intellectual Property Administration (CNIPA) on Nov. 12, 2021, the disclosures of which are incorporated herein by reference in their entireties.

TECHNICAL FIELD

The present application relates to the field of wireless communication technology, in particular, a method for detecting an artificial intelligence prediction beam, a node, and a storage medium.

BACKGROUND

An artificial Intelligence (AI) algorithm is a fast and efficient decision-making method based on historical data training and learning. The AI algorithm based on machine learning has attracted widespread attention in the field of communications. From the perspective of multiple-input multiple-output (MIMO) transmission, supporting the AI algorithm has the following advantages: The cost of feedback signaling and control signaling is saved, more accurate feedback results are provided, and system performance (for example, throughput and reliability) can be improved. For beam management, the AI algorithm may be applied to two fields of beam training and beam tracking. The beam training is mainly for millimeter-wave channels. Since the power of a non-scattering physical channel path is far lower than the lower reception limit of a receiver, the power of the non-scattering physical channel path is almost negligible in practical transmission, and the main path used for supporting subsequent data transmission is limited. Considering the sparse characteristics of millimeter-wave channels, the number of beam pairs available for transmission is far less than the number of candidate beam pairs. Thus, it is necessary to use machine learning to complete large-scale beam training. However, the main problem to be solved in the field of beam tracking is caused by equipment mobility. By detecting adjacent selectable beams, beam tracking can effectively track and compensate for changes in the optimal communication direction. However, without prior information, movement information such as the movement speed and direction of user equipment is uncertain. Therefore, in view of factors such as direction, speed, and position, it is important to determine the number and range of beams that need to be detected by the beam tracking. However, in an AI prediction process, inaccurate predictions occur in the following situations: The switching time interval does not match due to deceleration, parking, or the like; the speed change (such as acceleration or deceleration); the movement trajectory of user equipment is at a fork road, and the fork road is within the prediction time; and so on. No clear scheme has yet been proposed for this.

SUMMARY

The main object of embodiments of the present application is to propose a method for detecting an artificial intelligence prediction beam, a node, and a storage medium, which can re-determine a new target beam when a deviation exists in the detection beam to ensure normal communication.

Embodiments of the present application provide a method for detecting an artificial intelligence prediction beam. The method includes the following: A first communication node receives beam detection configuration information sent by a second communication node; the first communication node performs AI prediction beam quality detection according to the beam detection configuration information to obtain a beam quality value, and the first communication node re-determines a target beam in a case where the first communication node determines that the beam quality value does not meet a beam quality requirement.

Embodiments of the present application provide an apparatus for detecting an artificial intelligence prediction beam. The apparatus includes a reception module, a detection module, and a determination module. The reception module is configured to receive beam detection configuration information sent by a second communication node. The detection module is configured to perform AI prediction beam quality detection according to the beam detection configuration information to obtain a beam quality value. The determination module is configured to re-determine a target beam in a case where the detection module determines that the beam quality value does not meet a beam quality requirement.

Embodiments of the present application provide a communication node. The communication node includes a processor which, when executing a computer program, implements the method for detecting an artificial intelligence prediction beam provided in any embodiment of the present application.

Embodiments of the present application provide a readable and writeable storage medium storing a computer program which, when executed by a processor, implements the method for detecting an artificial intelligence prediction beam provided in any embodiment of the present application.

Embodiments of the present application provide the method for detecting an artificial intelligence prediction beam, the node, and the storage medium. The method includes the following: A first communication node receives beam detection configuration information sent by a second communication node, the first communication node performs AI prediction beam quality detection according to the beam detection configuration information to obtain the beam quality value, and the first communication node re-determines a target beam in the case where the first communication node determines that the beam quality value does not meet a beam quality requirement. Based on this implementation plan, a new target beam can be re-determined when a deviation exists in the detection beam.

DETAILED DESCRIPTION

Figure 1:
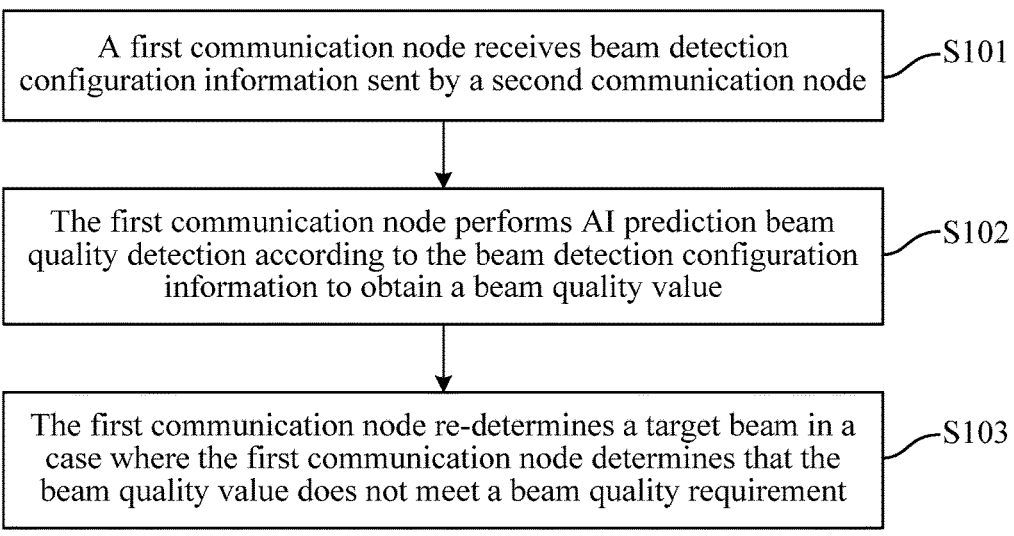
FIG. 1 is a flowchart of a method for detecting an artificial intelligence prediction beam according to an embodiment of the present application.

To illustrate the object, schemes, and advantages of the present application more clearly, embodiments of the present application are described hereinafter in detail in conjunction with drawings. It is to be noted that if not in collision, embodiments of the present application and features therein may be combined with each other in any manner.

In addition, in the embodiments of the present application, words such as "optionally" or "illustratively" are used for representing examples, illustrations, or descriptions. Any embodiment or design described as "optional" or "illustratively" in embodiments of the present application should not be explained as being more preferred or advantageous than other embodiments or designs. Rather, the use of words such as "optionally" or "illustratively" is intended to present related concepts in a specific manner.

To facilitate a clearer understanding of the technical schemes provided by embodiments of the present application, related concepts involved in the embodiments of the present application are explained herein as follows:

The content transmitted in new radio (NR) may be divided into data and signaling. A physical channel for transmitting the signaling includes a physical downlink control channel (PDCCH) and a physical uplink control channel (PUCCH); and a physical channel for transmitting the data includes a physical downlink shared channel (PDSCH) and a physical uplink shared channel (PUSCH). The PDCCH is mainly used for transmitting physical downlink control information (DCI), while the PUCCH is mainly used for transmitting uplink control information such as channel state information (CSI), a hybrid automatic repeat request (HARQ), and a scheduling request; the PDSCH is mainly used for transmitting downlink data; and the PUSCH is mainly used for transmitting uplink data and some uplink control information.

To obtain a spatial diversity gain, transmission may be performed by multiple beams. The specific beam to be used for transmission or reception needs to be indicated by a beam indication in beam management. When using analog beamforming for downlink transmission, a base station needs to indicate a sequence number of the downlink analog sending beam selected by the user equipment (UE). After receiving the indication, the UE calls the optimal reception beam corresponding to the sequence number based on the information stored in a beam training and pairing process for performing downlink reception. When the base station schedules the UE to use analog beamforming for uplink transmission, the base station needs to instruct the UE to receive auxiliary information of an uplink analog sending beam. After receiving the auxiliary information, the UE performs the uplink transmission according to the uplink analog sending beam corresponding to the auxiliary information indicated by the base station. The base station may call the reception beam corresponding to the sending beam for uplink reception according to the information stored in the beam training and pairing process. For the uplink beam indication of the PUCCH, PUCCH radio resources need to be configured. Different PUCCH resources are semi-statically configured with different sending beam directions. Different sending beam directions are selected by selecting a PUCCH radio resource to achieve beam switching in multiple directions.

FIG. 1 is a flowchart of a method for detecting an artificial intelligence prediction beam according to an embodiment of the present application. The method may be applied to mobile terminals (for example, a mobile phone held by a user in a moving vehicle). The mobile terminal detects an artificial intelligence prediction beam and reselects a new target beam if the mobile terminal determines that a deviation occurs in the AI prediction beam. As shown in FIG. 1, the method may include but is not limited to the following.

In S101, a first communication node receives beam detection configuration information sent by a second communication node.

In this embodiment of the present application, the first communication node may be understood as the preceding mobile terminal, and the second communication node may be understood as a base station that performs wireless communication with the mobile terminal. Further, the second communication node may semi-persistently and dynamically configure the beam detection configuration information to the first communication node.

Illustratively, the beam detection configuration information sent by the second communication node may include any one of a pattern for beam detection, a detection cycle, an indication identifier, an indication bit, or an AI detection mode.

In S102, the first communication node performs AI prediction beam quality detection according to the beam detection configuration information to obtain a beam quality value.

Since the second communication node configures information to the first communication node in a semi-persistent and dynamic manner, accordingly, the first communication node may detect beam quality in a semi-persistent and dynamic manner. Illustratively, the beam quality value may include reference signal receiving power (RSRP).

In S103, the first communication node re-determines a target beam in the case where the first communication node determines that the beam quality value does not meet a beam quality requirement.

In this embodiment of the present application, the beam quality value does not meet the beam quality requirement, which may be understood as that the number of beam detection failures is relatively large. For example, if the number of consecutive detection failures or the accumulated number of detection failures reaches a certain threshold within the range of a detection time threshold, it is considered that the beam quality value does not meet the beam quality requirement. One detection failure may be understood as that the beam quality value of one detection is smaller than the beam threshold.

This embodiment of the present application provides a beam detection method. The method includes the operations described below. A first communication node receives beam detection configuration information sent by a second communication node. The first communication node performs AI prediction beam quality detection according to the beam detection configuration information to obtain the beam quality value. The first communication node re-determines a target beam in the case where the first communication node determines that the beam quality value does not meet a beam quality requirement. Based on this implementation plan, a new target beam for normal communication can be re-determined when a deviation exists in the detection beam.

In an example, in a case where the preceding beam detection configuration information includes the pattern for beam detection, the operation S102 may include the following: The first communication node performs beam quality detection on a to-be-detected beam in the beam detection configuration information. Further, the preceding pattern for beam detection may include the to-be-detected beam and the time of the to-be-detected beam. For example, the second communication node may configure the pattern for beam detection to the first communication node in the manner of medium access control control element (MAC CE). The to-be-detected beam in the pattern may be from an AI prediction result of the second communication node. Alternatively, the to-be-detected beam and the current prediction beam of the second communication node have the same quasi-co-location (QCL) assumption. In an embodiment, the second communication node may also configure a set of configuration information with a timestamp to the first communication node for subsequent transmission of the first communication node. For example, if the first communication node determines that the to-be-detected beam does not meet the beam quality requirement, that is, beam invalidation occurs, the first communication node may directly use a beam in the set of configuration information for subsequent transmission.

In an example, the beam quality detection in S102 may also include the following: The first communication node receives an AI prediction beam set sent by the second communication node and detects a beam in the AI prediction beam set according to the beam detection configuration information. The beam detection configuration information may include any one item of the following: a detection cycle; an indication identifier configured to indicate a measurement mode; an indication bit configured to select a pattern of the to-be-measured beam; or an AI detection mode.

Figure 2:
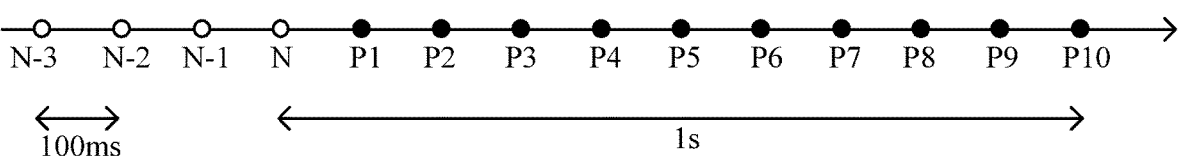
FIG. 2 is a diagram illustrating an AI prediction beam set according to an embodiment of the present application.

As shown in FIG. 2, it is assumed that the currently used beams are represented by N-3, N-2, N-1, and N; the time interval between two adjacent beams is 100 ms; P1 to P10 are a set of beam patterns predicted by the second communication node for the next 1 s, including [(Beam 2 T1), (Beam 1 T2), (Beam 2 T1), (Beam 7 T10), . . . ]. Each element in the set represents the target beam and the switching time at which the first communication node switches to the target beam. For example, the first communication node switches to Beam 2 at time T1. The first communication node may then detect beams in the beam set based on any item included in the preceding beam detection configuration information.

For example, the beam configuration information may include both the detection cycle and detection start time, that is, the first communication node performs beam quality detection based on the detection cycle and the detection start time. In an embodiment, the beam configuration information may include only the detection cycle, that is, the detection start time is not configured by the second communication node. Thus, the first communication node may use the start time of the AI prediction result as the detection start time by default or use the sum of the start time of the AI prediction result plus the time offset as the detection start time. The time offset may be configured in a static or semi-static manner by the second communication node whereby the first communication node may also perform beam quality detection by using the corresponding beam according to the detection start time.

In an embodiment, in the case where the beam configuration information includes the indication identifier of a dynamic indication, the second communication node may configure a specific measurement mode through radio resource control (RRC) and select or activate the corresponding mode based on MAC CE signaling. For example, in a case where the indication identifier indicates that the measurement mode is mode one, the first communication node performs beam quality detection on all beams in the AI prediction beam set; in a case where the indication identifier indicates that the measurement mode is mode two, the first communication node performs beam quality detection on every N beams in the AI prediction beam set. The value of N may be configured by the second communication node through RRC or may be a default value agreed by the first communication node and the second communication node in advance.

In the case where the beam configuration information includes the indication bit of a dynamic indication, the first communication node may detect the corresponding beam based on the indication of the indication bit. For example, in a case where the AI prediction beam set is [(Beam 2 T1) (Beam 1 T2) (Beam 2 T1) (Beam 7 T10)], after the indication bit indicates 1010, the first communication node may detect the first and third beam patterns, that is, (Beam 2 T1) and (Beam 2 T1), in the AI prediction beam set.

A reference signal in the beam configuration information may also include a channel state information reference signal (CSI-RS) or a demodulation reference signal (DMRS). For example, the CSI-RS is configured to detect candidate beams, and the DMRS is configured to indicate the detection of DMRSs of the currently sent PDCCH and PDSCH.

In an example, in the case where the beam detection configuration information includes the AI detection mode, the configuration manner may be adding the AItest configuration under the purpose parameter of RadioLinkMonitoringRS as shown below.

```
    RadioLinkMonitoringRS ::=            SEQUENCE {
        radioLinkMonitoringRS-Id        RadioLinkMonitoringRS-Id,
        purpose                             ENUMERATED {beamFailure, rlf,
both,AItest},
        detectionResource               CHOICE {
            ssb-Index                       SSB-Index,
            csi-RS-Index
NZP-CSI-RS-ResourceId
},
```

If the second communication node configures an indication of AItest mode, but the beam set for beam quality detection is not further configured, the first communication node may perform detection according to the default mode. For example, the first communication node detects all beams in the preceding AI prediction mode set at a default detection cycle.

In an embodiment, in S102, the first communication node may determine that the beam quality value does not meet the beam quality requirement based on the number of detection failures. For example, one AI prediction beam quality detection failure is determined in the case where the first communication node determines that the beam quality value is smaller than the beam quality threshold. On the contrary, one AI prediction beam quality detection success is determined in a case where the first communication node determines that the beam quality value is greater than or equal to the beam quality threshold. Further, the preceding number of detection failures may be divided into two cases, namely, the number of consecutive failures or the accumulated number of failures. That is, the first communication node may determine that the number of failures satisfies the detection termination condition based on the distribution of the number of detection failures and then determine that the beam quality value does not meet the beam quality requirement.

Figure 3:
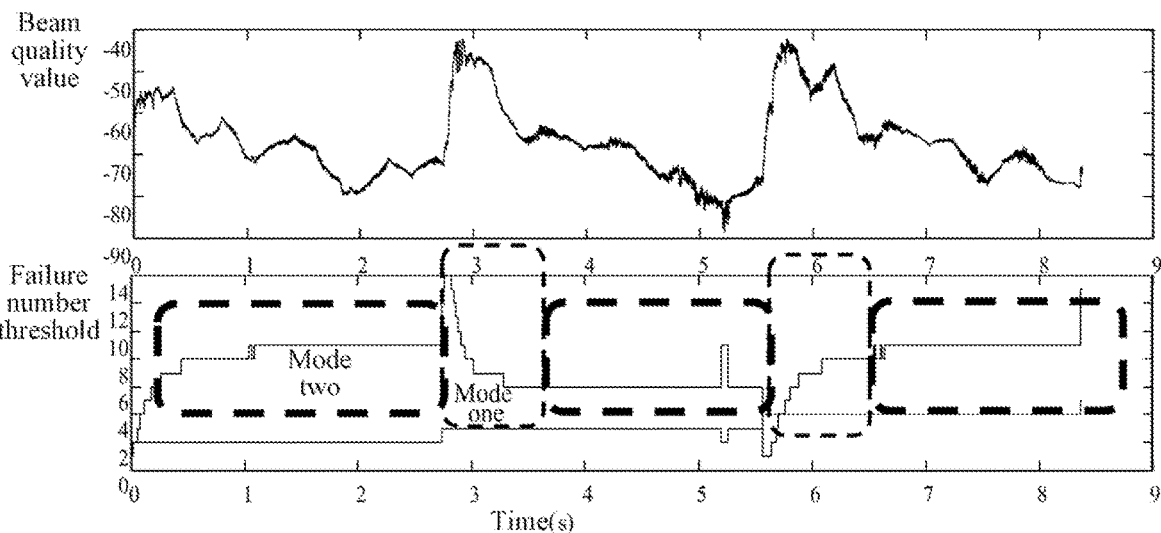
FIG. 3 is a diagram illustrating that different detection modes are used for beam quality change situations according to an embodiment of the present application.

As shown in FIG. 3, the upper part of the block diagram shows the changes in the beam quality value, the vertical axis indicates the beam quality value, and the horizontal axis indicates the time in seconds(s). The lower part of the block diagram shows that different detection modes are used for changes in beam quality, the vertical axis indicates the failure number threshold, and the horizontal axis indicates the time in seconds(s). For example, it is assumed that the failure number threshold in mode one is M, and the detection time threshold is N ms; the failure number threshold in mode two is P, and the detection time threshold is Q ms. As can be seen from FIG. 3, in the case of mode one, the accumulated number of failures is large, and the detection time threshold is short so that mode one may be applied to a rapid change stage of beams. In the case of mode two, the accumulated number of failures is small, and the detection time threshold is long so that mode two may be applied to a slow change stage of beams.

Further, the preceding detection time threshold may be understood as a time interval length of two failures or the length of one detection.

In a case where the detection time threshold is the time interval between two failures, if it is determined that the beam quality value does not meet the beam quality requirement by the number of consecutive failures, the first communication node may make a determination based on the following manners: For example, if the first communication node determines that the beam quality value is smaller than the beam quality threshold, the timing starts, and one failure is recorded. In the timing process, in a case where the timing time is smaller than the detection time threshold, if it is detected that the beam quality value is smaller than the beam quality threshold, one failure is recorded accumulatively, and the timing is restarted; on the contrary, if it is detected that the beam quality value is greater than or equal to the beam quality threshold, that is, a detection success, the accumulatively recorded number of failures and the timing time are cleared. When the first communication node determines that the accumulatively recorded number of failures reaches the failure number threshold and the timing time does not exceed the detection time threshold, it is determined that the distribution of the number of detection failures meets the detection termination condition.

In a case where the detection time threshold is the time interval between two failures, if it is determined that the beam quality value does not meet the beam quality requirement by the accumulated number of failures, the first communication node determines that the beam quality value is smaller than the beam quality threshold, the timing is started, and one failure is recorded. In the timing process, in the case where the timing time is smaller than the detection time threshold, if it is detected that the beam quality value is smaller than the beam quality threshold, that is, a detection failure, the number of failures is recorded accumulatively, and the timing is restarted; or if it is detected that the beam quality value is greater than or equal to the beam quality threshold, that is, a detection success, the number of failures is not recorded and the timing is continued. If the first communication node determines that the timing time reaches the detection time threshold and the accumulatively recorded number of failures reaches the failure number threshold, it is determined that the distribution of the number of detection failures satisfies the detection termination condition.

In a case where the detection time threshold is the length for one detection, if it is determined that the beam quality value does not meet the beam quality requirement by the number of consecutive failures, the first communication node determines that the beam quality value is smaller than the beam quality threshold, the timing is started, and one failure is recorded. In the timing process, when the timing time is smaller than the detection time threshold, if it is detected that the beam quality value is smaller than the beam quality threshold, that is, a detection failure, the number of failures is recorded accumulatively, and the timing is continued; or if it is detected that the beam quality value is greater than or equal to the beam quality threshold, that is, a detection success, the accumulatively recorded number of failures and the timing time are cleared. In the case where the first communication node determines that the accumulatively recorded number of failures reaches the failure number threshold and the timing time does not exceed the detection time threshold, it is determined that the distribution of the number of detection failures satisfies the detection termination condition.

In the case where the detection time threshold is the length for one detection, if it is determined that the beam quality value does not meet the beam quality requirement by the accumulated number of failures, the first communication node determines that the beam quality value is smaller than the beam quality threshold, the timing is started, and one failure is recorded. In the timing process, in the case where the timing time is smaller than the detection time threshold, if it is detected that the beam quality value is smaller than the beam quality threshold, that is, a detection failure, the number of failures is recorded accumulatively, and the timing is continued; or if it is detected that the beam quality value is greater than or equal to the beam quality threshold, that is, a detection success, the number of failures is not recorded and the timing is continued. If the first communication node determines that the timing time reaches the detection time threshold and the accumulatively recorded number of failures reaches the failure number threshold, it is determined that the distribution of the number of detection failures satisfies the detection termination condition.

Further, in any of the preceding cases, if the timing time is greater than the detection time threshold, the accumulatively recorded number of failures and the timing time are cleared. If the recorded number of failures reaches the failure number threshold, the accumulatively recorded number of failures and the timing time are cleared.

In an embodiment, in S103 the first communication node re-determines the target beam may include the following: The first communication node determines a first new beam as the target beam. The first new beam includes any one of an adjacent beam of the current beam; a beam indicated by MAC CE signaling; or a beam within a time window indicated by higher-layer signaling.

Figure 4:
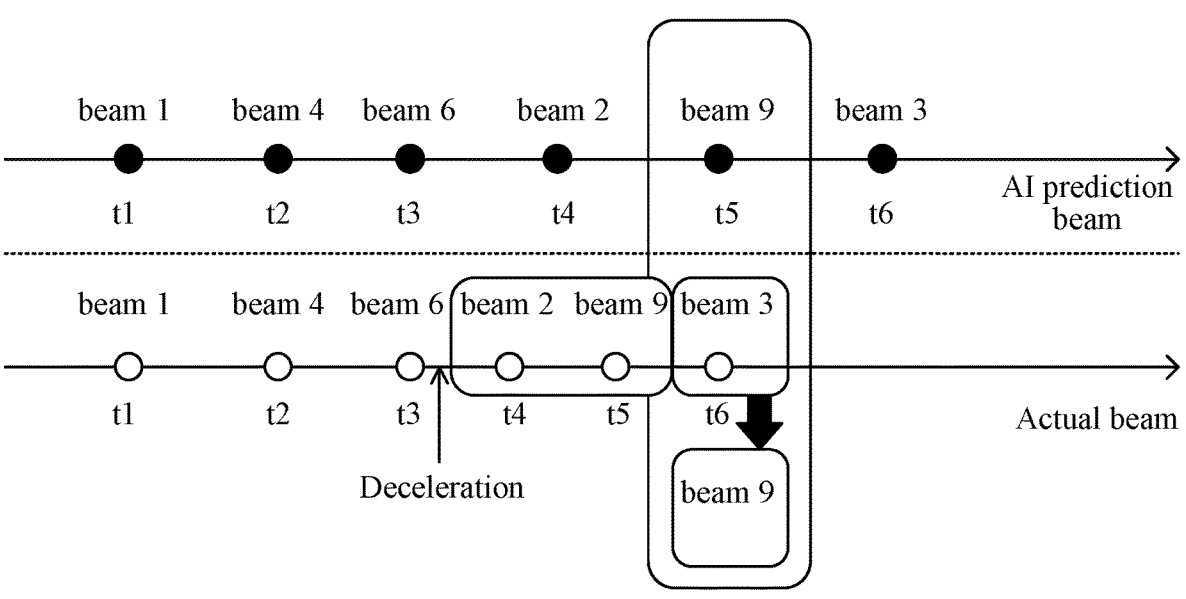
FIG. 4 is a diagram illustrating determination of a target beam when a vehicle decelerates or accelerates according to an embodiment of the present application.

For example, in a case where a vehicle decelerates or accelerates and the detected beam quality value does not meet the beam quality requirement, as shown in FIG. 4, if the prediction beam should be beam 3 at time t6, but the previous beam 9 may be the optimal beam at time t6 due to the deceleration of the vehicle, the first new beam corresponding to the configuration at time t6 should be beam 9 adjacent to beam 3.

Figure 5:
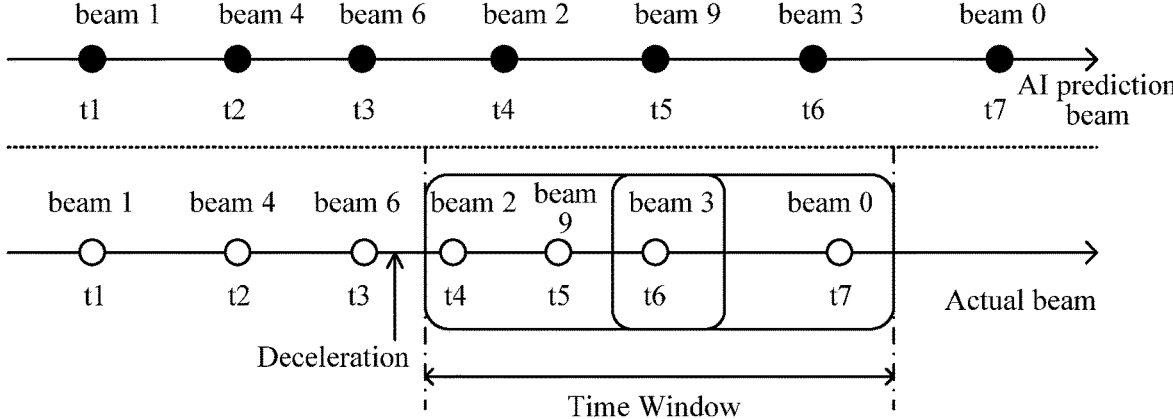
FIG. 5 is a diagram illustrating beams within a time window indicated by higher-layer signaling according to an embodiment of the present application.

If the beam quality value determined by the beam detection does not meet the beam quality requirement due to other reasons, the second communication node may indicate the pattern of the first new beam to the first communication node through MAC CE signaling. The first new beam may include a periodic or semi-persistent or non-periodic CSI-RS. The pattern may include multiple groups of CSI-RSs. Each group of CSI-RSs corresponds to one timestamp, for example, [CSI-RS #4 CSI-RS #6; t1], [CSI-RS #4 CSI-RS #2; t3], [CSI-RS #2 CSI-RS #9 CSI-RS #0; t6]. Illustratively, CSI-RS #4 may represent that the CSI-RS and beam 4 satisfy the QCL relationship, and the time point in each group of CSI-RSs and the time point for detecting a beam may have one-to-one correspondence. Alternatively, beams within a time window may be indicated by higher-layer signaling. For example, the time window is configured through RRC signaling or MAC CE signaling, and prediction beams within the time window all belong to candidate beams. As shown in FIG. 5, it is assumed that beam invalidation is detected at time t6, and the candidate beams may be determined as beam 2, beam 9, and beam 0 based on the time window.

In an embodiment, the first communication node may detect the first new beam and select a beam having the optimal measurement result among beams satisfying the beam quality threshold.

If the first communication node is unable to determine the target beam in the first new beam due to changes in the operating trajectory of the mobile terminal or an incorrect AI prediction beam, that is, the first new beam does not meet the beam quality requirement, the first communication node may determine the target beam in a second new beam. The second new beam may be a default beam (for example, a wide beam) configured by the second communication node, and the beam is a periodic or semi-persistent CSI-RS. The second new beam may be used for maintaining the normal communication after the first communication node exits the AI mode. Alternatively, the second new beam may also be a reference signal (RS) set for beam scanning measurement.

In an embodiment, the first communication node may also detect the second new beam and select a beam having the optimal measurement result among beams satisfying the beam quality threshold.

In an embodiment, after the first communication node re-determines the target beam, the embodiments of the present application also provide an implementation in which the first communication node does not report to the second communication node, and after determining that the first communication node switches to the target beam, the second communication node performs beam switching accordingly. For example, the second communication node makes further measurements after determining that communication reception fails and performs reception based on the configured new beam which the first communication node may use or based on the default wide beam.

Alternatively, the first communication node reports an AI mechanism exit request message to the second communication node and receives a response message fed back by the second communication node according to the AI mechanism exit request message. The first communication node switches to the target beam according to the response message.

In an embodiment, the AI mechanism exit request message reported by the first communication node may include at least one of the following: an index of the switched target beam; the current movement speed of the first communication node; or detection failure time.

Figure 6:
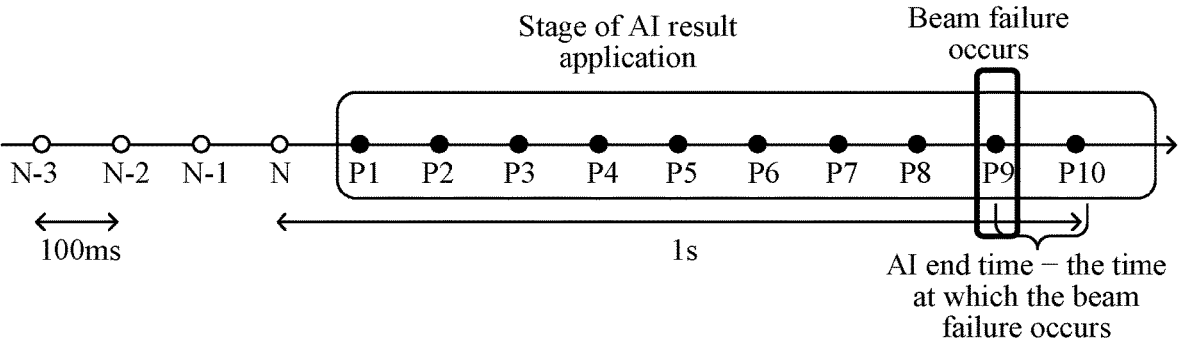
FIG. 6 is a diagram illustrating a reporting time range of an AI mechanism exit request message according to an embodiment of the present application.

In an embodiment, the first communication node reporting the AI mechanism exit request message to the second communication node may include two situations. One situation is that the first communication node determines that a time point at which the beam quality value does not meet the beam quality requirement belongs to a reporting time range, and the first communication node reports the AI mechanism exit request message to the second communication node. The preceding reporting time range may be understood as that the time of the beam detection failure is before the end time of the AI prediction result application and is far from the end time of the AI prediction result application, and then the first communication node reports. Otherwise, if the time of the beam detection failure is relatively close to the end time of the AI prediction result application, and the first communication node reports at this time, the AI application may have already ended after the second communication node receives the reporting message. Therefore, the reporting is meaningless, and uplink resources may be wasted. As shown in FIG. 6, it is assumed that at the stage of the AI result application, if the first communication node determines that the beam detection fails and the beam is invalid at the time when beam P9 is located, when the second communication node receives the reporting message, the application time of P10 passes (that is, the AI prediction result application time ends). In this case, the reporting by the first communication node is meaningless.

Illustratively, the first communication node may determine the reporting time range according to its own capabilities (for example, the time duration of information processing and information reporting) or based on the time threshold configured by the second communication node. For example, the reporting time range is determined as the time range before a time point obtained after the AI end time point is moved forward by the time duration threshold (Threshold). That is, if the AI end time minus the time at which the beam fails is greater than Threshold, the first communication node may report; and if the AI end time minus the time at which the beam fails is smaller than or equal to Threshold, the first communication node terminates reporting and may continue to perform reception using the current beam pattern or switch to a default wide beam to continue the reception.

Figure 7:
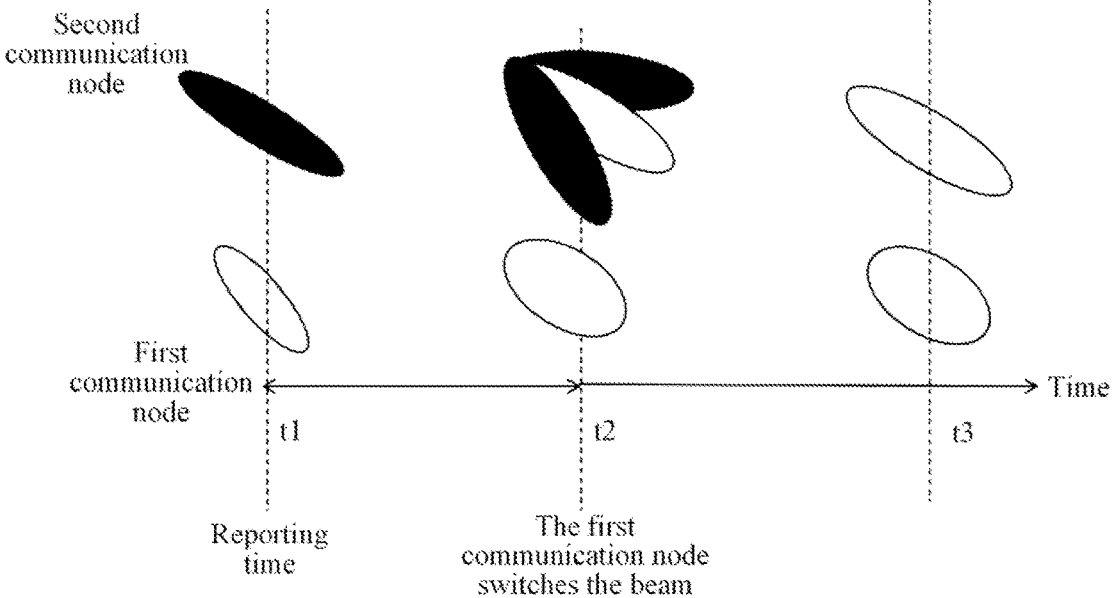
FIG. 7 is a diagram illustrating that the first communication node determines that an AI prediction beam is invalid for the first time and reports an AI mechanism exit request message to the second communication node according to an embodiment of the present application.

Another reporting case is that if the first communication node determines for the first time that the beam quality value is smaller than the beam quality threshold, the first communication node reports an AI mechanism exit request message to the second communication node. That is, when finding a detection failure for the first time, the first communication node reports to the second communication node; the second communication node starts synchronizing timing, and when the timing deadline is reached, the second communication node directly performs reception by using a possible beam. As shown in FIG. 7, when the first communication node finds that the AI prediction beam is invalid, the first communication node reports to the second communication node at time t1; after receiving the reported AI mechanism exit request message, the second communication node performs polling reception by using the beam that the first communication node may switch to determine the optimal beam, and the second communication node starts using this new beam for communication at time t3.

In an example, the response message fed back by the second communication node may include one of the following: reconfigured beam information that includes a beam index and switching time corresponding to the beam index; a scaling factor and start time of the pattern of the AI prediction beam, where the first communication node may perform scaling and application by itself; or default beam information.

Figure 8:
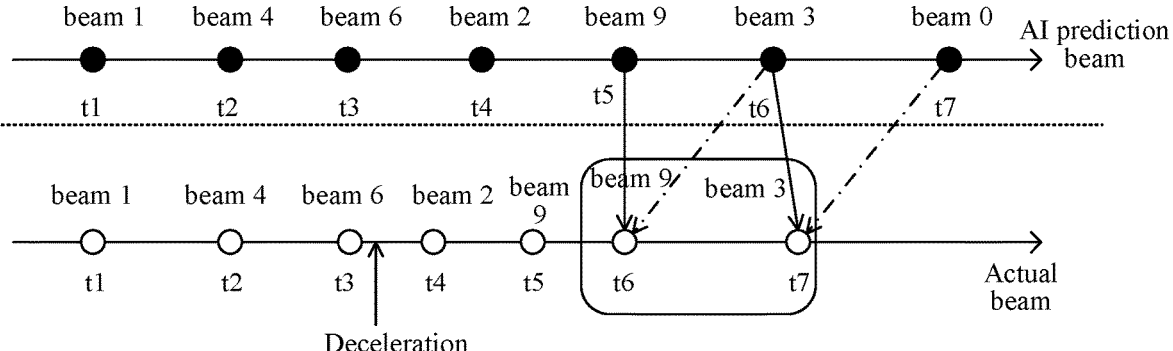
FIG. 8 is a diagram illustrating that the second communication node scales a beam pattern and indicates the pattern to the first communication node according to an embodiment of the present application.

For example, if the AI prediction beam detection fails due to a change in the movement speed of the first communication node, the second communication node may adjust the current prediction beam. For example, the second communication node determines the scaled beam pattern according to the current movement speed and detection failure time of the first communication node in the reported AI mechanism exit request message and re-indicates the scaled beam pattern to the first communication node in the form of a response message. As shown in FIG. 8, it is assumed that at time t5, the first communication node reports a beam invalidation, and the second communication node determines that the beam invalidation is caused by the deceleration of the first communication node according to the reported content; then the second communication node may perform scaling on the patterns corresponding to the remaining prediction results (for example, beam9, beam3, and beam0) and re-indicate the scaled patterns to the first communication node. The indicated content may include the reconfigured beam information or the scaling factor of the pattern of the AI prediction beam and the start time of the pattern of the AI prediction beam.

Figure 9:
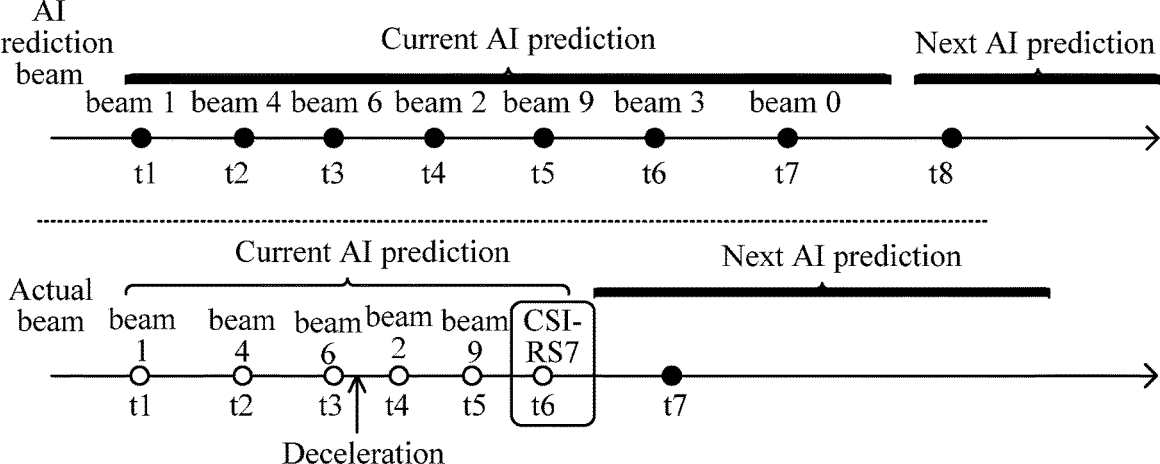
FIG. 9 is a diagram illustrating the start of a next AI prediction process according to an embodiment of the present application.

If the second communication node determines that the current prediction beam cannot continue to be used, the current prediction is terminated, and the next stage of the AI prediction process is started. Since the first communication node cannot continue communicating with the second communication node using the current prediction beam, the second communication node and the first communication node may establish a connection via a second new beam (that is, the default wide beam) and trigger the next AI prediction. The process may be shown in FIG. 9. For example, it is assumed that the first communication node finds at time t6 that the AI prediction beam is invalid, and the first communication node exits the AI mechanism and communicates using the wide beam CSI-RS7. After receiving the reported AI mechanism exit request message, the second communication node determines that the current AI prediction cannot continue to be performed, terminates the current AI prediction, and starts the next AI prediction process at time t7.

Figure 10:
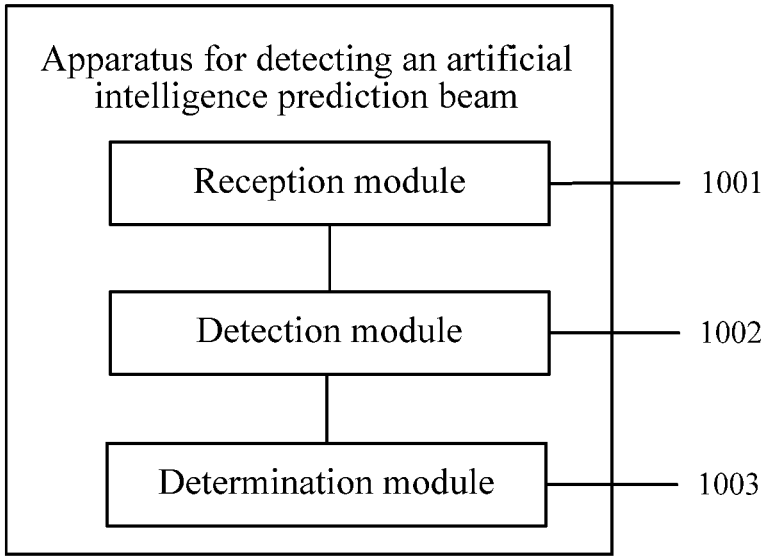
FIG. 10 is a diagram illustrating the structure of an apparatus for detecting an artificial intelligence prediction beam according to an embodiment of the present application.

FIG. 10 is a diagram illustrating the structure of an apparatus for detecting an artificial intelligence prediction beam according to an embodiment of the present application. As shown in FIG. 10, the apparatus may include a reception module 1001, a detection module 1002, and a determination module 1003. The reception module is configured to receive beam detection configuration information sent by a second communication node. The detection module is configured to perform AI prediction beam quality detection according to the beam detection configuration information to obtain a beam quality value. The determination module is configured to re-determine a target beam in a case where the detection module determines that the beam quality value does not meet a beam quality requirement.

In an embodiment, the detection module is configured to perform beam quality detection on a to-be-detected beam in the beam detection configuration information; the beam detection configuration information includes a pattern for beam detection, and the pattern includes the to-be-detected beam and the time of the to-be-detected beam; the to-be-detected beam is associated with an AI prediction beam of the second communication node, and the association includes the following: it is assumed that the to-be-detected beam and the current prediction beam of the second communication node have the same QCL, or the to-be-detected beam may be from an AI prediction result of the second communication node.

In an embodiment, the reception module may also be used for receiving an AI prediction beam set sent by the second communication node; the detection module is configured to detect a beam in the AI prediction beam set according to the beam detection configuration information; the beam detection configuration information may include any one of the following: a detection cycle; an indication identifier configured to indicate a measurement mode; an indication bit configured to select a to-be-measured beam pattern; or an AI detection mode.

In an embodiment, the determination module is configured to determine one detection failure when the beam quality value is determined to be smaller than the beam quality threshold; the determination module is configured to determine that the beam quality value does not meet the beam quality requirement in a case where the distribution of the number of detection failures satisfies a detection termination condition.

Illustratively, the preceding determination module may be used for executing the following determination logic: In the case where the detection time threshold is the time interval between two failures, if the determination module determines one detection failure, re-timing is performed, and the number of failures is recorded accumulatively; if the determination module determines one detection success, the accumulatively recorded number of failures and the timing time are cleared; if the determination module determines that the accumulatively recorded number of failures reaches the failure number threshold and the timing time does not exceed the detection time threshold, the determination module determines that the distribution of the number of detection failures satisfies the detection termination condition. In the case where the detection time threshold is the time interval between two failures, if the determination module determines one detection failure, the number of failures is recorded accumulatively, and the timing is restarted; if the determination module determines one detection success, the number of failures is not recorded, and the timing is continued; if the determination module determines that the timing time reaches the detection time threshold and the accumulatively recorded number of failures reaches the failure number threshold, the determination module determines that the distribution of the number of detection failures satisfies the detection termination condition. In the case where the detection time threshold is the length for one detection, if the determination module determines one detection failure, the number of failures is recorded accumulatively, and the timing is continued; if the determination module determines one detection success, the accumulatively recorded number of failures and the timing time are cleared; in the case where the determination module determines that the accumulatively recorded number of failures reaches the failure number threshold and the timing time does not exceed the detection time threshold, the determination module determines that the distribution of the number of detection failures satisfies the detection termination condition. In the case where the detection time threshold is the length for one detection, if the determination module determines one detection failure, the number of failures is recorded accumulatively, and the timing is continued; if the determination module determines one detection success, the number of failures is not recorded and the timing is continued; if the determination module determines that the timing time reaches the detection time threshold and the accumulatively recorded number of failures reaches the failure number threshold, the determination module determines that the distribution of the number of detection failures satisfies the detection termination condition. The preceding one detection success may include that the determination module determines the beam quality value being greater than or equal to the beam quality threshold.

In an embodiment, the determination module is also configured to determine a first new beam as the target beam; the first new beam includes any one of an adjacent beam of the current beam; a beam indicated by MAC CE signaling; or a beam within a time window indicated by higher-layer signaling.

In an embodiment, in the case where the first new beam does not meet the beam quality requirement, the determination module is also configured to determine a second new beam as the target beam; and the second new beam includes a default beam configured by the second communication node.

Figure 11:
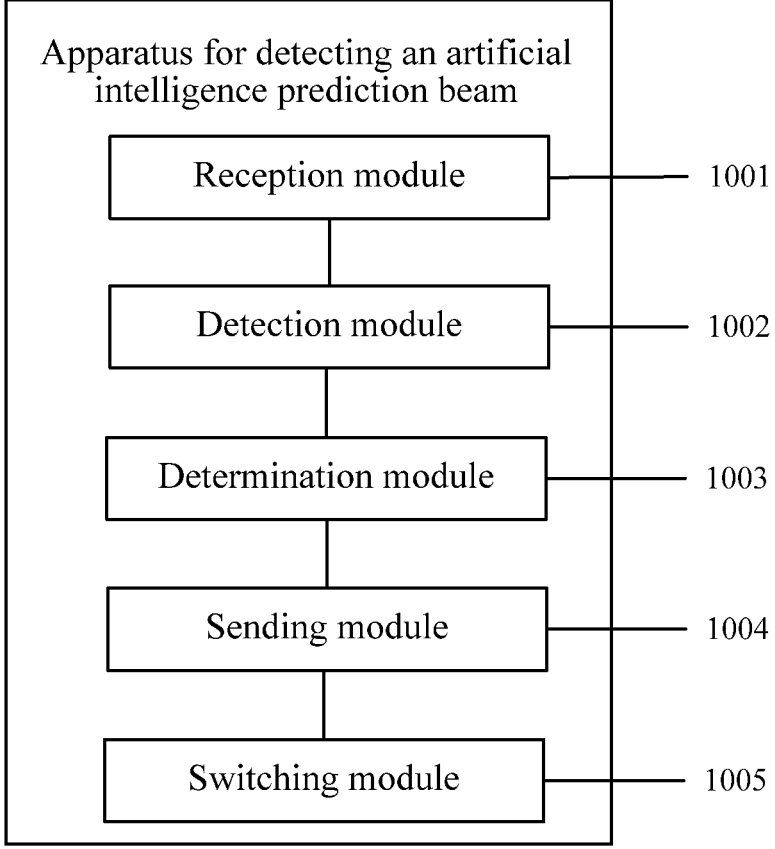
FIG. 11 is a diagram illustrating the structure of another apparatus for detecting an artificial intelligence prediction beam according to an embodiment of the present application.

As shown in FIG. 11, the preceding apparatus may also include a sending module 1004 and a switching module 1005; the sending module is configured to report an AI mechanism exit request message to the second communication node; the reception module is configured to receive a response message fed back by the second communication node according to the AI mechanism exit request message;

and the switching module is configured to perform beam switching according to the response message.

Illustratively, the AI mechanism exit request message includes at least one of the following: an of the switched target beam; the current movement speed of the first communication node; or detection failure time.

In an embodiment, in the case where the determination module determines that a time point whose beam quality value does not meet the beam quality requirement belongs to the reporting time range, the sending module is configured to report an AI mechanism exit request message to the second communication node.

Alternatively, in the case where the determination module determines for the first time that the beam quality value is smaller than the beam quality threshold, the sending module is also configured to report an AI mechanism exit request message to the second communication node.

Illustratively, the response message includes one of the following: reconfigured beam information, which includes a beam index and switching time corresponding to the beam index; a scaling factor of a pattern of the AI prediction beam and start time of the pattern of the AI prediction beam; or default beam information.

The apparatus for detecting an artificial intelligence prediction beam provided in this embodiment is configured to implement the method for detecting an artificial intelligence prediction beam as shown in FIG. 1 and has similar implementation principles and technical effects, which are not repeated herein.

Figure 12:
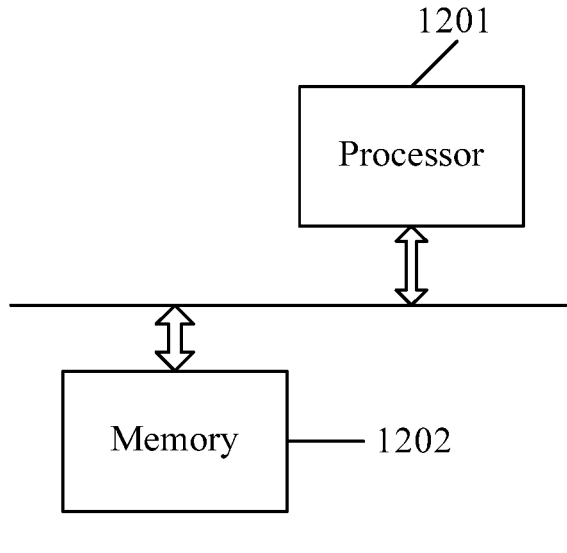
FIG. 12 is a diagram illustrating the structure of a communication node according to an embodiment of the present application.

FIG. 12 is a diagram illustrating the structure of a communication node according to an embodiment. As shown in FIG. 12, the node includes a processor 1201 and a memory 1202. One or more processors 1201 may be provided in the node, and one processor 1201 is used as an example in FIG. 12. The processor 1201 and the memory 1202 in the node may be connected via a bus or in other manners. In FIG. 12, the connection via the bus is used as an example.

As a computer-readable storage medium, the memory 1202 may be configured to store a software program, a computer-executable program, and a module, for example, a program instruction/module (for example, each module in the apparatus for detecting an artificial intelligence prediction beam provided in the embodiment of FIG. 10) corresponding to the method for detecting an artificial intelligence prediction beam in the embodiment of FIG. 1 of the present application. The processor 1201 performs the method for detecting an artificial intelligence prediction beam by running the software programs, instructions, and modules stored in the memory 1202.

The memory 1202 may mainly include a program storage region and a data storage region. The program storage region may store an operating system and an application program required by at least one function while the data storage region may store data created according to the use of a set-top box. Additionally, the memory 1202 may include a high-speed random-access memory and may also include a nonvolatile memory such as at least one disk memory, a flash memory, or other nonvolatile solid-state memories.

In an example, where possible, the processor in the preceding node may perform the method for detecting an artificial intelligence prediction beam through a hardware circuit such as an internal logic circuit or a gate circuit.

This embodiment of the present application also provides a readable and writeable storage medium for computer storage. The storage medium stores one or more programs. The one or more programs may be executed by one or more processors to execute the method for detecting an artificial intelligence prediction beam in the preceding embodiments.

It is to be understood by those of ordinary skill in the art that some or all operations in the preceding disclosed method and function modules/units in the device may be implemented as software, firmware, hardware, and suitable combinations thereof.

In the hardware implementation, the division of the preceding function modules/units may not correspond to the division of physical components. For example, one physical component may have multiple functions, or one function or operation may be performed jointly by several physical components. Some or all physical components may be implemented as software executed by a processor, such as a central processing unit, a digital signal processor, or a microprocessor, may be implemented as hardware, or may be implemented as integrated circuits, such as application-specific integrated circuits. Such software may be distributed on computer-readable media. The computer-readable media may include computer storage media (or non-transitory media) and communication media (or transitory media). As known to those of ordinary skill in the art, the term computer storage media includes volatile and non-volatile as well as removable and non-removable media implemented in any method or technology for storing information (such as computer-readable instructions, data structures, program modules, or other data). The computer storage medium includes, but is not limited to, a random-access memory (RAM), a read-only memory (ROM), an erasable programmable read-only memory (EEPROM), a flash memory or other memory technologies, a compact disc read-only memory (CD-ROM), a digital video disc (DVD) or other optical disc storages, a magnetic cassette, a magnetic tape, a magnetic disk or other magnetic storage apparatus, or any other medium that can be used for storing desired information and that can be accessed by a computer. Moreover, as known to those of ordinary skill in the art, the communication media generally include computer-readable instructions, data structures, program modules, or other data in a modulated data signal such as a carrier wave or other transport mechanism and may include any information delivery medium.

What is claimed is:

1. A method for detecting a predicted beam, comprising:
receiving, by a first communication node, beam detection configuration information sent by a second communication node;
performing, by the first communication node, predicted beam quality detection according to the beam detection configuration information to obtain a beam quality value; and
re-determining, by the first communication node, a target beam in response to the first communication node determining that the beam quality value does not meet a beam quality requirement;
wherein re-determining, by the first communication node, the target beam comprises:
determining, by the first communication node, a first new beam as the target beam, wherein the first new beam comprises one of the following: an adjacent beam of a current beam; a beam indicated by media access control control element (MAC CE) signaling; or a beam within a time window indicated by higher-layer signaling; and
in response to a beam quality value of the first new beam failing to meet the beam quality requirement, determining, by the first communication node, a second new beam as the target beam, wherein the second new beam comprises a default beam configured by the second communication node.

2. The method of claim 1, wherein performing, by the first communication node, the predicted beam quality detection according to the beam detection configuration information comprises:
performing, by the first communication node, beam quality detection on a to-be-detected beam in the beam detection configuration information;
wherein the beam detection configuration information comprises a pattern for beam detection, and the pattern comprises the to-be-detected beam and time of the to-be-detected beam;
the to-be-detected beam is associated with a beam predicted by the second communication node.

3. The method of claim 1, wherein performing, by the first communication node, the predicted beam quality detection according to the beam detection configuration information comprises:
receiving, by the first communication node, a predicted beam set sent by the second communication node; and
detecting, by the first communication node, a beam in the predicted beam set according to the beam detection configuration information;
wherein the beam detection configuration information comprises one of:
a detection cycle;
an indication identifier configured to indicate a measurement mode;
an indication bit configured to select a pattern of a to-be-measured beam; or
an artificial intelligence (AI) detection mode.

4. The method of claim 1, wherein determining, by the first communication node, that the beam quality value does not meet the beam quality requirement comprises:
determining, by the first communication node, one predicted beam quality detection failure in response to determining that the beam quality value is smaller than a beam quality threshold; and
determining, by the first communication node, that the beam quality value does not meet the beam quality requirement in response to determining that a distribution of a number of predicted beam quality detection failures satisfies a detection termination condition.

5. The method of claim 4, wherein determining, by the first communication node, that the distribution of the number of detection failures satisfies the detection termination condition comprises:
in a case where a detection time threshold is a time interval between two predicted beam quality detection failures, in response to the first communication node determining the one predicted beam quality detection failure, re-timing and recording accumulatively the number of predicted beam quality detection failures, or in response to the first communication node determining one predicted beam quality detection success, clearing the accumulatively recorded number of predicted beam quality detection failures and timing time; and in response to the first communication node determining that the accumulatively recorded number of predicted beam quality detection failures reaches a failure number threshold and the timing time does not exceed the detection time threshold, determining that the distribution of the number of predicted beam quality detection failures satisfies the detection termination condition;

in a case where a detection time threshold is a time interval between two predicted beam quality detection failures, in response to the first communication node determining the one predicted beam quality detection failure, recording accumulatively the number of predicted beam quality detection failures and re-timing, or in response to the first communication node determining one predicted beam quality detection success, not recording the number of predicted beam quality detection failures and continuing timing; and in response to the first communication node determining that timing time reaches the detection time threshold and the accumulatively recorded number of predicted beam quality detection failures reaches a failure number threshold, determining that the distribution of the number of predicted beam quality detection failures satisfies the detection termination condition;

in a case where a detection time threshold is a length of one predicted beam quality detection, in response to the first communication node determining the one predicted beam quality detection failure, recording accumulatively the number of predicted beam quality detection failures and continuing timing, or in response to the first communication node determining one predicted beam quality detection success, clearing the accumulatively recorded number of number of predicted beam quality detection failures and timing time; and in response to the first communication node determining that the accumulatively recorded number of predicted beam quality detection failures reaches a failure number threshold and the timing time does not exceed the detection time threshold, determining that the distribution of the number of predicted beam quality detection failures satisfies the detection termination condition; or in a case where a detection time threshold is a length of one predicted beam quality detection, in response to the first communication node determining the one predicted beam quality detection failure, recording accumulatively the number of predicted beam quality detection failures and continuing timing, or in response to the first communication node determining one predicted beam quality detection success, not recording the accumulatively recorded number of predicted beam quality detection failures and continuing timing; and in response to the first communication node determining that timing time reaches the detection time threshold and the accumulatively recorded number of predicted beam quality detection failures reaches a failure number threshold, determining that the distribution of the number of predicted beam quality detection failures satisfies the detection termination condition;

wherein the one predicted beam quality detection success comprises the first communication node determining that the beam quality value is greater than or equal to the beam quality threshold.

6. The method of claim 1, wherein after re-determining, by the first communication node, the target beam, the method further comprises:

reporting, by the first communication node, an AI mechanism exit request message to the second communication node and receiving a response message fed back by the second communication node according to the AI mechanism exit request message; and performing, by the first communication node, beam switching according to the response message.

7. The method of claim 6, wherein reporting, by the first communication node, the AI mechanism exit request message to the second communication node comprises:

reporting, by the first communication node, the AI mechanism exit request message to the second communication node in response to the first communication node determining that a time point whose beam quality value does not meet the beam quality requirement belongs to a reporting time range.

8. The method of claim 6, wherein reporting, by the first communication node, the AI mechanism exit request message to the second communication node comprises:

reporting, by the first communication node, the AI mechanism exit request message to the second communication node in response to the first communication node determining for a first time that the beam quality value is smaller than a beam quality threshold.

9. The method of claim 6, wherein the AI mechanism exit request message comprises at least one of:

an index of the switched target beam;

a current movement speed of the first communication node; or detection failure time.

10. The method of claim 6, wherein the response message comprises one of the following:

reconfigured beam information, wherein the reconfigured beam information comprises a beam index and switching time corresponding to the beam index;

a scaling factor of a pattern of the AI prediction beam and start time of the pattern of the AI prediction beam; or default beam information.

11. A communication node, comprising a processor which, when executing a computer program, implements the following:

receiving beam detection configuration information sent by a second communication node;

performing predicted beam quality detection according to the beam detection configuration information to obtain a beam quality value; and re-determining a target beam in response to the communication node determining that the beam quality value does not meet a beam quality requirement;

wherein re-determining the target beam comprises:

determining a first new beam as the target beam, wherein the first new beam comprises one of the following: an adjacent beam of a current beam; a beam indicated by media access control control element (MAC CE) signaling; or a beam within a time window indicated by higher-layer signaling; and in response to a beam quality value of the first new beam failing to meet the beam quality requirement, determining a second new beam as the target beam, wherein the second new beam comprises a default beam configured by the second communication node.

12. The communication node of claim 11, wherein the processor, when executing the computer program, implements performing the predicted beam quality detection according to the beam detection configuration information by:

performing beam quality detection on a to-be-detected beam in the beam detection configuration information;

wherein the beam detection configuration information comprises a pattern for beam detection, and the pattern comprises the to-be-detected beam and time of the to-be-detected beam;

the to-be-detected beam is associated with a beam predicted by the second communication node.

13. The communication node of claim 11, wherein the processor, when executing the computer program, implements performing the predicted beam quality detection according to the beam detection configuration information by:

receiving a predicted beam set sent by the second communication node; and detecting a beam in the predicted beam set according to the beam detection configuration information;

wherein the beam detection configuration information comprises one of:

a detection cycle;

an indication identifier configured to indicate a measurement mode;

an indication bit configured to select a pattern of a to-be-measured beam; or an artificial intelligence (AI) detection mode.

14. The communication node of claim 11, wherein the processor, when executing the computer program, implements determining that the beam quality value does not meet the beam quality requirement by:

determining one predicted beam quality detection failure in response to determining that the beam quality value is smaller than a beam quality threshold; and determining that the beam quality value does not meet the beam quality requirement in response to determining that a distribution of a number of predicted beam quality detection failures satisfies a detection termination condition.

15. The communication node of claim 14, wherein the processor, when executing the computer program, implements determining that the distribution of the number of detection failures satisfies the detection termination condition by:

in a case where a detection time threshold is a time interval between two predicted beam quality detection failures, in response to the communication node determining the one predicted beam quality detection failure, re-timing and recording accumulatively the number of predicted-beam quality detection failures, or in response to the communication node determining one predicted beam quality detection success, clearing the accumulatively recorded number of predicted beam quality detection failures and timing time; and in response to the communication node determining that the accumulatively recorded number of predicted beam quality detection failures reaches a failure number threshold and the timing time does not exceed the detection time threshold, determining that the distribution of the number of predicted beam quality detection failures satisfies the detection termination condition;

in a case where a detection time threshold is a time interval between two predicted beam quality detection failures, in response to the communication node determining the one predicted beam quality detection failure, recording accumulatively the number of predicted beam quality detection failures and re-timing, or in response to the communication node determining one predicted beam quality detection success, not recording the number of predicted beam quality detection failures and continuing timing; and in response to the communication node determining that timing time reaches the detection time threshold and the accumulatively recorded number of predicted beam quality detection failures reaches a failure number threshold, determining that the distribution of the number of predicted beam quality detection failures satisfies the detection termination condition;

in a case where a detection time threshold is a length of one predicted beam quality detection, in response to the communication node determining the one predicted beam quality detection failure, recording accumulatively the number of predicted beam quality detection failures and continuing timing, or in response to the communication node determining one predicted beam quality detection success, clearing the accumulatively recorded number of number of predicted beam quality detection failures and timing time; and in response to the communication node determining that the accumulatively recorded number of predicted beam quality detection failures reaches a failure number threshold and the timing time does not exceed the detection time threshold, determining that the distribution of the number of predicted beam quality detection failures satisfies the detection termination condition; or in a case where a detection time threshold is a length of one predicted beam quality detection, in response to the communication node determining the one predicted beam quality detection failure, recording accumulatively the number of predicted beam quality detection failures and continuing timing, or in response to the communication node determining one predicted beam quality detection success, not recording the accumulatively recorded number of predicted beam quality detection failures and continuing timing; and in response to the communication node determining that timing time reaches the detection time threshold and the accumulatively recorded number of predicted beam quality detection failures reaches a failure number threshold, determining that the distribution of the number of predicted beam quality detection failures satisfies the detection termination condition;

wherein the one predicted beam quality detection success comprises the communication node determining that the beam quality value is greater than or equal to the beam quality threshold.

16. The communication node of claim 11, wherein the processor, when executing the computer program, further implements:

reporting an AI mechanism exit request message to the second communication node and receiving a response message fed back by the second communication node according to the AI mechanism exit request message; and performing beam switching according to the response message.

17. The communication node of claim 16, wherein the processor, when executing the computer program, implements reporting the AI mechanism exit request message to the second communication node by:

reporting the AI mechanism exit request message to the second communication node in response to the communication node determining that a time point whose beam quality value does not meet the beam quality requirement belongs to a reporting time range.

18. The communication node of claim 16, wherein the processor, when executing the computer program, implements reporting the AI mechanism exit request message to the second communication node by:

reporting the AI mechanism exit request message to the second communication node in response to the communication node determining for a first time that the beam quality value is smaller than a beam quality threshold.

19. The communication node of claim 16, wherein the AI mechanism exit request message comprises at least one of:
an index of the switched target beam;
a current movement speed of the communication node; or
detection failure time.

20. A non-transitory readable and writeable storage medium storing a computer program which, when executed by a processor, implements the following:
receiving beam detection configuration information sent by a second communication node;
performing predicted beam quality detection according to the beam detection configuration information to obtain a beam quality value; and
re-determining a target beam in response to determining that the beam quality value does not meet a beam quality requirement;
wherein re-determining the target beam comprises:
determining a first new beam as the target beam, wherein the first new beam comprises one of the following: an adjacent beam of a current beam; a beam indicated by media access control control element (MAC CE) signaling; or a beam within a time window indicated by higher-layer signaling; and
in response to a beam quality value of the first new beam failing to meet the beam quality requirement, determining a second new beam as the target beam, wherein the second new beam comprises a default beam configured by the second communication node.

\* \* \* \* \*